Figure 4:
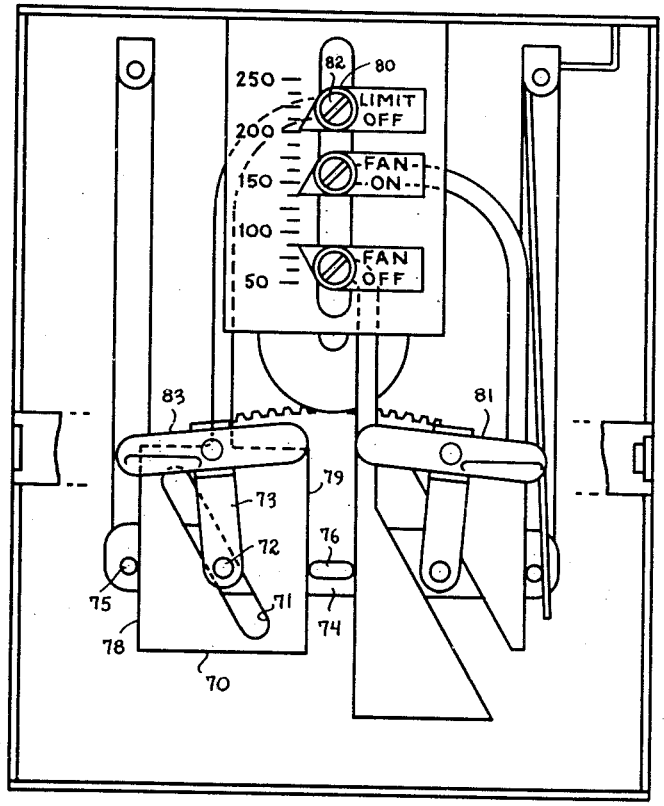

Aug. 3, 1943.   C. G. KRONMILLER   2,326,040
COMBINATION SWITCH
Filed Aug. 16, 1940    2 Sheets-Sheet 1
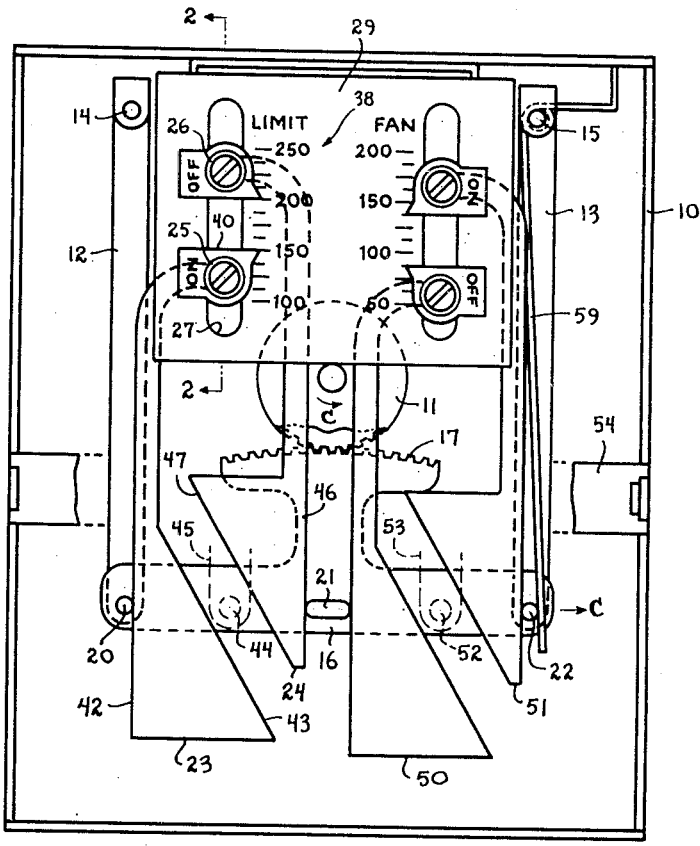
Fig.1
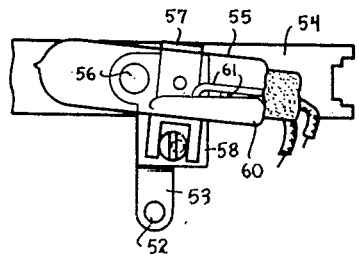
Fig.2
Fig.3
INVENTOR
Carl G. Kronmiller
BY George H. Fisher
ATTORNEY Aug. 3, 1943.   C. G. KRONMILLER   2,326,040
COMBINATION SWITCH
Filed Aug. 16, 1940   2 Sheets-Sheet 2

INVENTOR
Carl G. Kronmiller
BY
George H. Fisher
ATTORNEY

Patented Aug. 3, 1943

2,326,040

UNITED STATES PATENT OFFICE 2,326,040

COMBINATION SWITCH

Carl G. Kronmiller, Minneapolis, Minn., assignor to Minneapolis-Honeywell Regulator Company, Minneapolis, Minn., a corporation of Delaware Application August 16, 1940, Serial No. 352,874

24 Claims. (Cl. 200—138)

This invention relates to automatic switching mechanisms, and one of its objects is to improve that type of mechanism wherein a plurality of switches are sequentially operated by a single condition responsive element; such as, for example, a combination fan and high limit control actuated by a temperature responsive device.

Another object of this invention is to provide improved means for adjusting the closing and opening temperatures of the several switches.

A further object of this invention is to provide a connection between a condition responsive element and a switch, such that the force opposing motion of the condition responsive element is substantially constant during all positions of the switch, whereby actuation of the switch will not affect the calibration of the condition responsive element.

It has been proposed to use such a mechanism as that herein disclosed to control a hot air heating system wherein a fan is used to force the circulation of heated air through the house. In such a case the actuating thermostat for the two switches is placed in the bonnet of the furnace and the high limit switch is wired in series with the main controlling thermostat so as to shut down the heating system in case the air temperature in the furnace bonnet becomes excessive. The fan switch controls the operation of the fan and is usually set to keep the fan deenergized when the air in the bonnet is cool. As soon as the air becomes warm enough to heat the house, the fan switch closes to start the fan in operation. This normally results in a drop in temperature of the bonnet air with a consequent opening of the fan switch. It is desirable, however, in order to prevent "hunting," to provide an appreciable differential between the temperature at which the fan starts to operate and the temperature at which its energizing circuit is opened.

It has been found desirable, in order to provide a device which is readily adaptable to the requirements of different heating systems, to include in a combination fan and limit switch means for making the closing and opening temperatures of the switches readily adjustable.

Since, in a device of this sort, the operating force supplied by the condition responsive element is small, it is essential that the switches used be operated with a minimum of force. Furthermore, it is desirable that the force opposing motion of the condition responsive element be as nearly constant as possible, in order that actuation of one switch will not upset the calibration of the condition responsive element, thereby changing from their predetermined values the temperatures at which succeeding switches are operated.

Other objects and advantages of the invention will readily become apparent as the following description is read in the light of the accompanying drawings, in which:

Figure 1 is a front view, with the cover and certain other parts removed, of a combination fan and limit switch actuating mechanism embodying my invention, Figure 2 is a cross section on the line 2—2 of Figure 1, looking in the direction of the arrows, showing in detail part of the adjusting mechanism of the invention, Figure 3 is a front view of a mercury switch suitable for use with the switch actuating mechanism of Figure 1, and Figure 4 is a front view of a modification of the switch actuating mechanism of Figure 1.

Figure 1

In Figure 1 is shown a casing or frame 10 which supports the switches of my invention and the actuating means therefor. A gear 11 is journalled in the casing 10 and may be turned by any suitable condition responsive means, such as a conventional spiral thermostatic element (not shown) which extends outwardly from the rear of the casing. A pair of cranks 12 and 13 are pivoted at 14 and 15, respectively, to the casing 10. Pivotally attached to the free ends of these cranks is a swinging beam 16. Centrally located on the swinging beam 16 and forming a part of said beam is a gear segment 17 which cooperates with gear 11.

The beam 16 is provided with a series of forwardly extending lugs 20, 21, and 22. A pair of pusher arms 23 and 24 are pivotally supported on shafts 25 and 26, respectively. The shafts 25 and 26 are vertically adjustable in grooves 27 and 28 in a pair of plates 29 and 30 which are spaced apart and attached to the casing 10 in any suitable manner. Rigid with the shafts 25 and 26, respectively, are pinions 31 and 32, which engage a spring rack 33. The spring rack 33 has a depressed central portion 34 which is attached in any suitable manner to the casing 10 and side portions 35 and 36 which are sprung outwardly from the casing so as to forcibly engage the teeth of the pinions 31 and 32. These side portions are slotted as at 37 to increase their flexibility and are provided at their outer edges with upstanding toothed members which form the actual rack engaging with the pinions 31 and 32.

The plate 29 is provided adjacent the slot 27 with a scale generally indicated at 38. Each of the shafts 25 and 26 has loosely mounted thereon an indicator member 40 and is provided at its outer end with a screw head 41 or other suitable means for manually rotating the pinion and thereby adjusting the arms 23 and 24 vertically.

The arm 23 is provided at the left side of its lower end, as it appears in the drawings, with a vertical surface 42 which is adapted to engage the lug 20. At the right hand side of the lower portion of the arm 23 is a diagonal surface 43 which is adapted to engage a lug 44 attached to the lower end of a switch actuating lever 45. Similarly the arm 24 is provided with a vertical surface 46 along its right hand side which may be engaged by lug 21 and a diagonal surface 47 along its left hand side which also cooperates with the lug 44 on the switch actuating lever 45. Between the lugs 21 and 22 lie a second pair of pusher arms 50 and 51 which are similar to the arms 23 and 24 and are adapted to engage a lug 52 on a second switch actuating lever 53.

A bar 54 extends transversely of the casing 10. A pair of mercury switches, one of which is shown at 55 in Figure 3, are pivotally supported on the bar 54. The switch 55 is mounted on a clamp 57 attached to a bracket 58. The bracket 58 is pivoted to the bar 54 at 56 and is provided with a downwardly extending lever 53 which has the lug 52 extending rearwardly therefrom at its lower end. The pivot 56 is actually between the bar 54 and mercury switch 55 and is seen in Figure 3 by looking through the glass of the mercury switch. The pivotal connection 56 between the bracket 58 and the bar 54 is of the slip friction type, so that after a switch is turned to a given position accidental rotation of the switch due to vibration or gravity is prevented.

A coil spring 59 is mounted about the pivot 15. One end of this coil spring engages the casing 10 while the other end engages the lug 22 so as to bias the swinging beam 16 for movement to the left. The spring 59 is chosen so that the torque supplied by it to the lug 22 greatly exceeds the torque required to rotate the switch actuating levers 45 and 53. Therefore, the net torque transmitted to the gear 11, through the segment 17, which the torque provided by the thermostatic element opposes, is substantially constant, the variations occasioned by actuation of the switches being negligible. The spring 59 also serves to take up the back-lash between gear 11 and segment 17.

*Operation of Figure 1 species*

This device is adapted to be mounted in the bonnet of a furnace and forms a part of a hot air heating system wherein a fan is used to force circulation of the air when the bonnet temperature is above a certain amount. Means are provided for turning the fan on when the bonnet temperature exceeds a certain amount, shown in the drawings as 137.5°. The fan is then allowed to remain on until the bonnet temperature has dropped to another level, shown in the drawings as 87½°.

This device also provides a limit switch which is connected in series with the main controlling thermostat (not shown) and which serves to shut down the furnace if the bonnet temperature becomes dangerously high. The setting of the limit switch, as shown in Figure 1, is such as to shut off the burner at a bonnet temperature of 200°. When once opened, the limit switch is not reclosed by my device until the bonnet temperature has dropped to a safe level, shown in Figure 1 as 150°.

The gear 11 is rotated by the temperature responsive device in a clockwise direction when the temperature is increasing and in a counter-clockwise direction when the temperature is decreasing. Clockwise rotation of the gear 11 will cause the segment 17 and the associated beam 16 to move to the left while counter-clockwise rotation of the gear 11 will move the beam 16 to the right.

Let it be assumed that the furnace is cold and that the beam has been moved to its extreme right hand position. In this position the lever 45 has been pushed to the right by the lug 20 acting through the pusher arm 23 and the lug 44. The limit switch (not shown) which is actuated by the lever 45 has been tilted to the left and is closed, since it is mounted oppositely to the fan switch 55 shown in Figure 3. The actuating lever 53 for the fan switch 55 has also been pushed to the right by the lug 21 acting through the pusher arm 50 and the lug 52. The switch 55 has therefore been tilted to the left so that the pool of mercury 60 has moved to the left end of the switch and away from the contacts 61, so that the fan circuit is open.

If in response to a demand for heat by the controlling thermostat the furnace starts to operate the bonnet temperature will begin to rise. The gear 11 will rotate in a clockwise direction driving the beam 16 to the left. The switch actuating levers 45 and 53, being held in frictional engagement with their associated pivots will remain in their previously described positions until the beam 16 has moved through a distance sufficient that the width of the pusher arm 51 just closes the gap between the lugs 22 and 52. When this gap has been closed the lug 22 acting through pusher arm 51 and lug 52 moves the switch actuating lever 53 to the left so that the switch 55 is gradually tilted until the mercury pool 60 moves to the right and engages the contacts 61. This completes an energizing circuit for the fan of the heating system and starts a forced draft of air through the bonnet of the furnace. This normally results in a reduction of the bonnet temperature with a consequent reversal of motion of the beam 16. In normal operation the bonnet temperature will not be reduced by the fan sufficiently to cause the fan switch to open. After the furnace has been shut down by the controlling thermostat however, the bonnet temperature will continue to fall until the lug 21, in moving to the right with the beam 16, engages the pusher arm 50 and forces it against the lug 52 to move the switch actuating arm 53 to the right thereby opening the fan switch.

If the fan fails to operate, or if for some other reason the bonnet temperature rises to a dangerous level, the movement of the beam 16 to the left will continue until the width of the pusher arm 24 closes the gap between lugs 21 and 44. Continued motion of the pin 16 after these parts have come into engagement will result in the movement of the switch actuating lever 45 to the left with a consequent opening of the limit switch.

Opening of the limit switch will shut down the furnace causing the bonnet temperature to drop. When the temperature has again reached a safe level the limit switch will again be moved to its on position. When the temperature first starts to drop after the limit switch has opened the actuating lever 45 is not moved because the pusher arm 23 does not completely close the gap between lugs 20 and 44. As the temperature continues to drop, however, continued movement of the beam 16 to the right causes lug 20 acting through the pusher arm 23 to move the lug 44 and the switch actuating lever 45 to the right, thereby moving the limit switch again to its closed position.

If it is desired to change the temperature at which the limit switch is moved to its open position the screw head 41 may be turned by means of a screw driver so as to rotate the pinion 32 thereby moving the same along the rack 33. The resulting vertical movement of the pusher arm 24 will change the effective width of that arm between the lugs 21 and 44. It will be seen therefore that the switch actuating lever 45 will be moved to open the limit switch at a different position of the swinging beam 16, which will correspond to a different bonnet temperature. By providing a properly calibrated scale on the plate 29 and an indicator on the shaft 26 the temperature at which the limit switch is set to open may be readily determined. In a similar manner the closing temperature of the limit switch and the opening and closing temperatures of the fan switch may be set at any desired value within the range of the instrument.

*Figure 4*

In Figure 4 I have shown a modification of the device of Figure 1 wherein the differential between the opening and closing temperatures of the limit switch is fixed and wherein the limit switch adjustment and the fan switch adjustment are on the same rack so that it is impossible to change the fan switch adjustment to turn the fan on at a temperature higher than that at which the limit switch is opened.

If such an adjustment were made in the device of Figure 1 the limit switch would be turned off before the fan switch was ever close so that the fan would never be operated. The arrangement of Figure 4 prevents the possibility of an accidental adjustment of the device to such a position. In Figure 4 the pusher arms 23 and 24 which operated the limit switch in the device of Figure 1 have been replaced by a single pusher arm 70 having a slot 71 passing diagonally therethrough in which a lug 72 on a limit switch actuating lever 73 operates. A swinging beam 74, which is actuated in the same manner as the beam 16 in Figure 1, is provided with lugs 75 and 76 which cooperate with the vertical left and right hand surfaces 78 and 79 of the arm 70, respectively. The arm 70 is pivotally attached to a shaft 80 which is adjustable in the same manner as the shafts 25 and 26 of Figure 1. A fan switch 81 is provided in the device of Figure 4 which operates in exactly the same manner as the switch 55 of Figure 1.

An adjusting screw 82 on the shaft 80 serves to move the pusher arm 70 in a vertical direction. Such movement changes the horizontal distance between that part of the slot 71 in which the lug 72 moves and the lugs 75 and 76, consequently changing the temperatures at which the limit switch 83 is actuated to its open and closed positions. Since the slot 71 is of constant width the differential between the opening and closing temperatures of the limit switch will be constant for all settings of the device.

*Operation of Figure 4 species*

Since the operation of the fan switch 81 of Figure 4 is the same as that of fan switch 55 of Figure 1 it will not be discussed further.

If the bonnet temperature in the device of Figure 4 rises toward a dangerous value, movement of the swinging beam 74 to the left will continue until the pusher arm 70 has closed the gap between the lugs 72 and 76. Continued movement of the swinging beam 74 to the left will result in operation of the switch actuating lever 73 to the left so as to tilt the mercury switch 83 to open position. The resultant cooling of the furnace will cause the swinging beam 74 to move in the opposite direction. When this opposite movement first starts the lever 73 will not be actuated because of the space between the elements 70, 72, and 75. This space is exactly the same as the width of the slot 71 in a horizontal direction. As soon as the swinging beam 74 has moved back to the right a distance exactly equal to the horizontal width of slot 71 the lug 72 will engage the side of said slot and the switch actuating member 73 will accordingly be moved to the right and the limit switch 83 will be moved to closed position. It will be seen that regardless of the vertical setting of the arm 70 the effective width of the slot 71 will be the same so that the swinging beam 74 must move through exactly the same distance between the positions at which it actuates the limit switch to open and close it. It should further be apparent that since the fan and limit switch adjusting means work along the same rack and in the same slot that the fan closing temperature can never be adjusted to be greater than the limit switch opening temperature.

While I have shown and described the specific embodiments of my invention it will be understood that the scope of the invention is limited only by the appended claims.

I claim as my invention:

1. In combination, a member movable in response to the variations in a variable condition, a pair of spaced lugs on said member, a switch, actuating means for said switch, a pusher arm for transmitting motion from said member to said actuating means, said arm having a first surface for engaging one of said lugs, and a second surface for engaging said actuating means, said arm being of variable thickness between said surfaces, and supported so as to move freely along the line of motion of said member, and means for adjusting said arm transversely of said line of motion, so as to present portions of varying thickness between said lug and said actuating means, thereby adjusting the magnitude of said condition at which said switch is actuated.

2. In combination, a member movable in response to the variations in a variable condition, a pair of spaced lugs on said member, a switch, actuating means for said switch, a pair of pusher arms positioned between said lugs and on opposite sides of said actuating means for transmitting motion from said lugs to said actuating means, each arm having a first surface on one side for engaging one of said lugs, and a second surface on its opposite side for engaging said actuating means, each arm being of variable thickness between said surfaces, and means for independently adjusting each said arm transversely of the line of motion of said member, so as to present portions of varying thickness between each said lug and said actuating means, thereby adjusting the magnitudes of said condition at which said switch is opened and closed.

3. In combination, a member movable in response to the variations in a variable condition, a pair of spaced lugs on said member, a switch, actuating means for said switch, a pusher arm for transmitting motion from said member to said actuating means, said arm having a surface on either side thereof for engaging one of said lugs, and a slot extending diagonally thereacross for engaging said actuating means, and means for adjusting said arm transversely of the line of motion of said member, so as to regulate the position of said actuating means with respect to said member, thereby adjusting the magnitude of said condition at which said switch is actuated.

4. In combination, a member movable in response to the variations in a variable condition, a pair of spaced lugs on said member, a switch, actuating means for said switch, a pusher arm for transmitting motion from said member to said actuating means, said arm having a first surface for engaging one of said lugs, and a second surface for engaging said actuating means, said arm being of variable thickness between said surfaces, a frame for supporting said member and said switch, a rack on said frame extending in a direction transverse to the line of motion of said member, a pinion for engagement with said rack, and a shaft for said pinion, said pusher arm being journalled on said pinion shaft for movement along said rack upon rotation of said pinion, so as to present portions of said arm of varying thickness between said lug and said actuating means, thereby adjusting the magnitude of said condition at which said switch is actuated.

5. In combination, a member movable in response to the variations in a variable condition, a pair of spaced lugs on said member, a switch, actuating means for said switch a pusher arm for transmitting motion from said member to said actuating means, said arm having a first surface for engaging one of said lugs, and a second surface for engaging said actuating means, said arm being of variable thickness between said surfaces, a frame for supporting said member and said switch, a rack on said frame extending in a direction transverse to the line of motion of said member, a pinion for engagement with said rack, and a shaft for said pinion, a pair of slots in said frame on opposite sides of said rack and parallel thereto for receiving portions of said shaft, said rack being spring biased against said pinion so as to hold said shaft in frictional engagement with the sides of said slot, said pusher arm being journalled on said pinion shaft for movement along said rack upon rotation of said pinion, so as to present portions of said arm of varying thickness between said lug and said actuating means, thereby adjusting the magnitude of said condition at which said switch is actuated.

6. In combination, a member movable in response to the variations in a variable condition, a pair of spaced lugs on said member, a switch, actuating means for said switch, a pusher arm for transmitting motion from said member to said actuating means, said arm having a first surface for engaging one of said lugs, and a second surface for engaging said actuating means, said arm being of variable thickness between said surfaces, a frame for supporting said member and said switch, a rack on said frame extending in a direction transverse to the line of motion of said member, a pinion for engagement with said rack, and a shaft for said pinion, a pair of slots in said frame on opposite sides of said rack and parallel thereto for receiving portions of said shaft, said rack being spring biased against said pinion so as to hold said shaft in frictional engagement with the sides of said slot, said pusher arm being journalled on said pinion shaft for movement along said rack upon rotation of said pinion, so as to present portions of said arm of varying thickness between said lug and said actuating means, thereby adjusting the magnitude of said condition at which said switch is actuated, a scale on said frame adjacent one of said shaft-receiving slots, indicator means mounted freely on said shaft for translation along said slot to indicate the position of said pinion and thereby said last mentioned magnitude, and means for manually rotating said pinion shaft.

7. In combination, a member movable in response to the variations in a variable condition, a pair of spaced lugs on said member, a switch, actuating means for said switch, a pusher arm for transmitting motion from said member to said actuating means, said arm having a first surface for engaging one of said lugs, and a second surface for engaging said actuating means, said arm being of variable thickness between said surfaces, a frame for supporting said member and said switch, a rack on said frame extending in a direction transverse to the line of motion of said member, a pinion for engagement with said rack, and a shaft for said pinion, said pusher arm being journalled on said pinion shaft for movement along said rack upon rotation of said pinion, so as to present portions of said arm of varying thickness between said lug and said actuating means, thereby adjusting the magnitude of said condition at which said switch is actuated, a slot in said frame to receive said pinion shaft, a scale on said frame adjacent said slot, indicator means mounted freely on said shaft for translation along said slot to indicate the position of said pinion and thereby said last mentioned magnitude, and means for manually rotating said pinion shaft.

8. In combination, a member movable in accordance with the variations of a variable condition, a switch operable upon movement of said member, means connecting said member with said switch, means for adjusting said connecting means to vary the magnitude of said condition at which said switch is actuated, and a frame for supporting said switch and said member, said adjusting means comprising a rack and a pinion for engaging said rack, said rack having a depressed central portion attached to said frame, and flexible side portions with upturned toothed edge portions for engaging said pinion, said pinion having a shaft, and said frame having a pair of slots spaced on opposite sides of said rack for receiving said shaft, the proportions of said rack, pinion and slots being such that the side portions of the rack are flexed so as to cause forcible engagement of the rack with the pinion, and of the pinion shaft with the sides of the slot.

9. In combination, a member movable in accordance with the variations of a variable condition, a switch operable upon movement of said member, means connecting said member with said switch, means for adjusting said connecting means to vary the magnitude of said condition at which said switch is actuated, and a frame for supporting said switch and said member, said adjusting means comprising a rack and a pinion for engaging said rack, said rack having a depressed central portion attached to said frame, and flexible side portions with upturned toothed edge portions for engaging said pinion, said flexible side portions being slotted transversely from said edge portions toward said center portion, said pinion having a shaft, and said frame having a pair of slots spaced on opposite sides of said rack for receiving said shaft, the proportions of said rack, pinion and slots being such that the side portions of the rack are flexed so as to cause forcible engagement of the rack with the pinion, and of the pinion shaft with the sides of the slot.

10. In combination, a member movable in accordance with the variations of a variable condition, a switch operable upon movement of said member, means connecting said member with said switch, means for adjusting said connecting means to vary the magnitude of said condition at which said switch is actuated, and a frame for supporting said switch and said member, said adjusting means comprising a rack and a pinion for engaging said rack, said rack having a depressed central portion attached to said frame, and flexible side portions with upturned toothed edge portions for engaging said pinion, said pinion having a shaft, and said frame having a pair of slots spaced on opposite sides of said rack for receiving said shaft, the proportions of said rack, pinion and slots being such that the side portions of the rack are flexed so as to cause forcible engagement of the rack with the pinion, and of the pinion shaft with the sides of the slot, and means for indicating the magnitude of said condition at which said switch will be actuated, comprising a scale on said frame adjacent one of said slots, indicator means mounted freely on said shaft for translation along said slot to indicate the position of said pinion and thereby said last mentioned magnitude, and means for manually rotating said pinion shaft.

11. In combination, a member rotatable in accordance with the variations of a variable condition, a switch operable upon movement of said member, a frame for supporting said switch and said member, a pair of spaced cranks each pivoted at one end to said frame, a beam pivoted at either end to the free end of one of said cranks, means operatively connecting said beam and said member for reciprocating said beam upon rotation of said member, a spring biasing said beam for motion in one direction, a pair of spaced lugs on said beam, actuating means for said switch, a pusher arm for transmitting motion from said beam to said actuating means, said arm having a first surface for engaging one of said lugs, and a second surface for engaging said actuating means, said arm being of variable thickness between said surfaces, and supported so as to move freely along the line of motion of said member, and means for adjusting said arm transversely of said line of motion, so as to present portions of varying thickness between said lug and said actuating means, thereby adjusting the magnitude of said condition at which said switch is actuated.

12. In combination, a member rotatable in accordance with the variations of a variable condition, a switch operable upon movement of said member, a frame for supporting said switch and said member, a pair of spaced cranks each pivoted at one end to said frame, a beam pivoted at either end to the free end of one of said cranks, means operatively connecting said beam and said member for reciprocating said beam upon rotation of said member, a spring biasing said beam for motion in one direction, actuating means for said switch, and a lost motion connection between said beam and said actuating means.

13. In combination, a member movable in response to a variable condition, a plurality of switches connected to said member for operation in sequence upon movement thereof, each said switch having first and second operative positions, a housing for supporting said member and said switches, a plate member fixed on said housing, said plate having slot means therein and scale means adjacent said slot means, manually movable indicator means supported by said plate and extending through said slot means for cooperation with said scale means, and connections between said indicator means, said member and said switches, such that the magnitude of said condition at which each said switch is operated from one position to the other is determined by the position of a part of said indicator means with respect to said scale.

14. In combination, fixed supporting means, a member movable in response to variable condition, a pair of switches, means operatively connecting said member and said switches, said connecting means including, for one of said switches, a pair of actuators for separately actuating said one switch in opposite directions, means for pivotally mounting each of said actuators on said fixed supporting means, and means for individually adjusting the position of the pivotal mountings of each of said actuators so as to independently determine the magnitudes of said condition at which said switch is moved to on and off positions, without affecting the operation of the other of said switches.

15. In combination, a member movable in accordance with the variations of a variable condition, a plurality of switches connected to said member for operation in sequence upon movement thereof, each said switch having first and second operative positions, means for determining the magnitude of said condition at which each said switch is moved from its first position to its second position and separate means for determining the magnitude of said condition at which certain of said switches is moved from its second position to its first position, means for establishing a fixed differential between the condition magnitude at which certain others of said switches are moved from first position to second position and the magnitude at which said last mentioned switches are moved from second position to first position, and a fixed plate associated with said switches, said plate having a slot and a scale adjacent said slot, each said magnitude determining means including a manually movable indicator yieldably mounted on said plate and extending through said slot and cooperating with said scale to indicate the particular condition magnitude determined thereby.

16. In combination, a member movable in accordance with the variations of a variable condition, a switch operable upon movement of said member, means connecting said member with said switch, means for adjusting said connecting means to vary the magnitude of said condition at which said switch is actuated, said adjusting means comprising a toothed rack and a pinion, for engaging the teeth of said rack, said rack having a fixed portion and a flexible portion intermediate said fixed portion and said teeth, and means for supporting said pinion in engagement with said teeth so as to flex said intermediate portion, thereby biasing said teeth for forcible engagement with said pinion.

17. In combination, a member movable in accordance with the variations of a variable condition, a switch operable upon movement of said member, a first link connected to said member, a second link connected to said switch, a lost-motion connection between said first and second links including a third link operable to transmit motion between said first and second links when all the lost motion in said connection is taken up, a fixed plate, a member adjustable with respect to said plate and cooperating with said third link so that the position of said adjustable member determines the position of said first link at which all said lost motion is taken up and hence the value of said condition at which said condition responsive member actuates said switch.

18. In combination, a member movable in accordance with the variations of a variable condition, a plurality of switches connected to said member for operation in a predetermined sequence upon movement thereof, each said switch having first and second operative positions, means for determining the magnitude of said condition at which each said switch is moved from its first position to its second position and separate means for determining the magnitude of said condition at which certain of said switches is moved from its second position to its first position, a fixed member associated with said switches, and a single scale on said fixed member, each said magnitude determining means including a manually movable indicator yieldably mounted on said plate and having a portion cooperating with said scale to indicate the particular magnitude determined thereby.

19. In combination, a member movable in response to the variations of a variable condition, a plurality of switches, a plurality of connecting means whereby each of said switches is actuated by said condition responsive member, fixed supporting means, a first member, first means for pivotally mounting said first member on said fixed supporting means, means for adjusting the position of said first pivotal mounting, and said first member cooperable with one of said connecting means for varying the value of the condition at which one of said switches is actuated, a second member, second means for pivotally mounting said second member on said fixed supporting means, means for adjusting the position of said second pivotal mounting, and said second member cooperable with another of said connecting means for varying the value of the condition at which another of said switches is actuated.

20. In combination, a member movable in response to the variations of a variable condition, a plurality of switches, a plurality of connecting means whereby each of said switches is actuated by said condition responsive member, fixed supporting means, a first adjustable member mounted on said fixed supporting means and cooperable with one of said connecting means for varying the value of the condition at which one of said switches is actuated in one direction, a second adjustable member mounted on said fixed supporting means and cooperable with a second of said connecting means for varying the value of the condition at which said one switch is actuated in the other direction, and a third adjustable member mounted on said fixed supporting means and cooperable with a third of said connecting means for varying the value of the condition at which a second of said switches is actuated.

21. In combination, a member movable in response to the variations of a variable condition, a plurality of switches, a plurality of connecting means whereby each of said switches is actuated by said condition responsive member, fixed supporting means, a first adjustable member mounted on said fixed supporting means and cooperable with one of said connecting means for varying the value of the condition at which one of said switches is actuated in one direction, a second adjustable member mounted on said fixed supporting means and cooperable with a second of said connecting means for varying the value of the condition at which said one switch is actuated in the other direction, a third adjustable member mounted on said fixed supporting means and cooperable with a third of said connecting means for varying the value of the condition at which a second of said switches is actuated in one direction, and a fourth adjustable member mounted on said fixed supporting means and associated with a fourth of said connecting means for varying the value of the condition at which said second switch is actuated in the opposite direction.

22. In combination, a member movable in response to variable condition, a switch, means operatively connecting said member and said switch, said connecting means including an actuator, a switch arm for engagement by said actuator for actuating said switch, means for pivotally mounting said actuator and a variable cam surface provided on said actuator for engaging said switch arm, and means for adjusting the position of said pivotal mounting so as to vary the position of said variable cam surface in such a manner as to determine the magnitude of said condition at which said switch is actuated by said actuator.

23. In combination, a member movable in response to variable condition, a switch, means operatively connecting said member and said switch, said connecting means including an actuator, a switch arm for operation by said actuator for actuating said switch, means for mounting said actuator, a variable cam surface provided on said actuator for engaging said switch arm, and means for adjusting the position of said mounting so as to vary the position of said variable cam surface in relation to said switch arm for determining the magnitude of said condition at which said actuator may cause the actuation of said switch.

24. In combination, a member movable in accordance with the variations of a variable condition, a switch to be operated upon movement of said movable member, an operator member connected to said switch, a stationary member, means for transmitting motion between said movable member and said operator member comprising a pair of levers pivotally supported on one of said members, each said lever being operable to transmit motion between said members in one direction only, and a lost-motion connection between said movable member and said levers, means associated with said stationary member for limiting the movement of said levers with respect thereto, and means for adjusting said movement limiting means to determine the position of said movable member at which all the lost-motion in said connection is taken up and hence the value of said condition at which said switch is operated by said movable member.

CARL G. KRONMILLER.